3,417,155
SELECTIVE RECOVERY OF DIOLEFINIC HYDROCARBONS
Joseph T. Arrigo, Mount Prospect, Ill., assignor to Universal Oil Products Company, Des Plaines, Ill., a corporation of Delaware
No Drawing. Filed Aug. 11, 1967, Ser. No. 659,861
4 Claims. (Cl. 260—666)

ABSTRACT OF THE DISCLOSURE

The selective recovery of cyclodecadienic hydrocarbons from a mixture of cyclodecadienic, decatrienic and cyclododecatrienic hydrocarbons is accomplished by treating the mixture with silver nitrate and recovering the diolefinic hydrocarbons from the resulting diolefinic hydrocarbon-silver nitrate complex which is formed thereby.

---

This invention relates to a process for the selective removal of diolefinic hydrocarbons from mixtures of various polyolefinic hydrocarbons and to the recovery thereof. More specifically, the invention is concerned with a process for selectively removing diolefinic hydrocarbons from a mixture of various polyolefinic hydrocarbons including triolefinic and other unsaturated hydrocarbons by utilizing a certain complexing agent.

Sebacic acid has become a particularly important chemical in modern day technology, said acid being an intermediate in the preparation of certain synthetic fibrous material and synthetic lubricants. The sebacic acid may be prepared from cis-cyclodecene by conventional means. However, in order to obtain the starting material for the preparation of sebacic acid, it is necessary to go through a series of steps starting with the cyclocooligomerization of two moles of butadiene with one mole of ethylene in the presence of certain catalysts such as $\pi$-allylic nickel complexes. Following the preparation of the trans-, cis-1,5-cyclodecadiene, the latter compound is then converted to cis-cyclodecene. However, in the past, the conversion of the aforementioned trans-,cis-1,5-cyclodecadiene to cis-cyclodecene has been accomplished with less selectivity than is desired, and therefore renders the process inadequate for commercial use. Essentially complete conversion of the trans-,cis-1,5-cyclodecadiene to cis-cyclodecene is desirable inasmuch as it is extremely difficult and impractical to separate the unconverted cyclodecadiene by conventional means, the recovered trans-, cis-1,5-cyclodecadiene being then utilized for recycle when a continuous process is used or for recovery for further use in a batch type process.

The formation of the product resulting from a butadiene-ethylene cyclocooligomerization reaction will contain several polyunsaturated by-products including both diolefinic and triolefinic compounds. Therefore, it is necessary, in order to provide a relatively pure product for the subsequent hydrogenation of trans-,cis-1,5-cyclodecadiene, to remove these triolefinic compounds which may be present as unwanted by-products. For example, a typical cyclocooligomerization product resulting from the reaction of butadiene and ethylene will contain, in addition to the aforementioned trans-,cis-1,5-cyclodecadiene, unwanted side products such as 1,4,9-decatriene and 1,5,9-cyclododecatriene, as well as the hydrocarbon solvent which is utilized in the reaction. It has now been discovered that, by utilizing a selective complexing agent of the type hereinafter set forth in greater detail, the desired product may be removed from the reaction mixture and recovered from the complex.

It is therefore an object of this invention to provide a process for the selective removal of a desired compound from a mixture of said compound and unwanted isomers.

A further object of this invention is to provide a process for the selective removal of a desired compound from a reaction mixture utilizing certain complexing agents as the means for effecting the removal.

In one aspect an embodiment of this invention resides in a process for the selective removal of a diolefinic hydrocarbon from a mixture of diolefinic and triolefinic hydrocarbons which comprises treating said mixture with a silver nitrate solution, separating the resultant solid diolefinic hydrocarbon-silver nitrate complex from said triolefinic hydrocarbons, and recovering the diolefinic hydrocarbon from said solid complex.

A specific embodiment of this invention is found in a process for the selective removal of t,c-1,5-cyclodecadiene from a mixture of t,c-1,5-cyclodecadiene, 1,4,9-decatriene and 1,5,9-cyclododecatriene by treating said mixture with an aqueous silver nitrate solution containing from about 10% to about 75% silver nitrate at a temperature in the range of from about 10° to about 60° C., separating the resultant solid t,c-1,5-cyclodecadiene-silver nitrate complex from said 1,4,9-decatriene and 1,5,9-cyclododecatriene, and thereafter recovering the desired product by treating said solid complex with aqueous ammonia to yield t,c-1,5-cyclodecadiene and a silver-ammonia inorganic complex.

Other objects and embodiments will be found in the following further detailed description of the present invention.

As hereinbefore set forth the present invention is concerned with a process for the selective removal of diolefinic compounds, and particularly diolefinic hydrocarbons from a polyunsaturate mixture of olefinic compounds. By utilizing a certain complexing agent to effect this removal, the necessity for other types of separation such as fractional distillation, fractional crystallization etc. will be negated. This is of commercial importance in certain processes among which is the separation of t,c-1,5-cyclodecadiene from admixture with certain trienes inasmuch as the aforesaid t,c-1,5-cyclodecadiene is heat-sensitive and will have a tendency to decompose during the distillation step.

The selective removal of t,c-1,5-cyclodecadiene from the polyunsaturate mixture which comprises the reaction product of butadiene-ethylene cyclocooligomerization process can be effected by utilizing certain selective complexing agents. The particular selective complexing agent which is utilized in the process of this invention comprises a silver nitrate solution, and preferably an aqueous silver nitrate solution which contains from about 10 weight percent to about 75 weight percent of silver nitrate in the solution, and preferably an aqueous silver nitrate solution containing from about 10 to about 40 weight percent silver nitrate. The treatment of the polyunsaturate mixture with the silver nitrate solution may be effected over a relatively wide range of temperature, and may range from about 10° up to about 60° C., the preferred temperatures being that which will maintain a liquid-liquid system.

The t,c-1,5-cyclodecadiene will form a solid complex with the silver nitrate and thus will be readily separable by conventional means such as filtration from the liquid polyunsaturated side products which are undesired, said polyunsaturated side products including 1,4,9-decatriene (a straight-chain unsaturate), and 1,5,9-cyclododecatriene (a cyclic polyunsaturate). The desired diolefinic hydrocarbon may then be readily separated from the solid complex and recovered for use in a subsequent operation to prepare the desired product by various means. One method of decomposing the solid diolefinic hydrocarbon-silver nitrate complex is to use ammonia, preferably in the form of ammonia hydroxide to decompose the complex and liberate the diolefinic hydrocarbon. The resulting silver-ammonia inorganic complex by-product may then be readily reconverted to an aqueous silver nitrate solution by treatment with nitric acid, thereby lending itself readily to a cyclic process. It is also contemplated within the scope of this invention that the solid diolefinic hydrocarbon-silver nitrate complex may be decomposed in a thermal manner by heating the solid complex to its decomposition temperature. This is preferably effected at a temperature in the range of from about 125° C. to about 160° C. at a reduced pressure in a range of from about 0.1 to about 5 mm. pressure. The thermal decomposition is also effected for a relatively short period of time ranging from about 1 to about 30 seconds of contact time. This flash pyrolysis will result in the formation of the diolefinic hydrocarbon, which is recovered by conventional means and solid silver nitrate. The latter could then, if so desired, be heated to its melting point (about 212° C.) and handled as a liquid stream for a cyclic process by returning it to a quench vessel where it admixed with water to reform the aqueous solution. When effecting the process of the present invention it is contemplated that the silver nitrate will be present in a molar excess of the diolefinic hydrocarbon, said silver nitrate being present in a ratio from about 2:1 up to about 10:1 or more moles of silver nitrate per mole of diolefinic hydrocarbon.

The process of this invention may be effected in any suitable manner and may comprise either a batch type operation or continuous type operation. For example, when a batch type operation is used, a polyunsaturate mixture which may, in one instance, be the product resulting from the cyclocooligomerization between an alkene such as ethylene and alkadiene such as butadiene, will be placed in an appropriate apparatus which possesses means for mechanically admixing the reactants. Such means may include a mechanical stirrer or a mechanical shaker. The aqueous silver nitrate solution containing silver nitrate of from about 10 to about 40 weight percent is added to the polyunsaturate mixture and, if so desired, a substantially inert organic solvent such as n-pentane, n-hexane, cyclopentane and cyclohexane may also be added to facilitate a liquid-liquid contact. The resulting reaction mixture is then thoroughly admixed by means of a stirrer, agitator, or a shaker for a predetermined period of time which may range from about 1 up to 24 hours or more. In addition, the reactor and contents thereof are maintained at predetermined operating conditions depending upon whether a liquid-liquid process or a liquid-solid process is desired. At the end of the aforementioned residence time, the diolefinic hydrocarbon-silver nitrate complex is filtered off and treated by being washed with water, pentane and dried. The resulting solid complex may then be treated in any manner similar to that hereinbefore set forth to recover the desired diolefinic hydrocarbon. For example, the solid complex may be decomposed by treating with an excess amount of concentrated ammonia hydroxide and the resulting hydrocarbon phase is then purified by conventional means.

It is also contemplated within the scope of this invention that the process of said invention may be effected in a continuous manner of operation. When such a type of operation is used, a quantity of the polyunsaturate mixture which may be from any source, one example being the result of a cyclocooligomerization reaction, is continuously charged to a reaction vessel which is maintained at the proper operating conditions of temperature and pressure. In addition the silver nitrate solution possessing a predetermined concentration of silver nitrate is also continuously charged to the reactor by separate means. In addition, if so desired, a solvent of the type hereinbefore set forth is added to the reactor in order to facilitate a liquid-liquid contact. The polyunsaturate mixture and silver nitrate are thoroughly admixed in the reactor by mechanical means for a predetermined period of time at the end of which time the reactor effluent is continuously withdrawn. The solid diolefinic hydrocarbon-silver nitrate complex is separated from unreacted polyunsaturates and recovered. The latter may then be recycled to the reaction zone as a portion of the feed stock. After recovery of the solid complex, it is subjected to decomposition by treatment with ammonia hydroxide or treated in a thermal manner by means of flash pyrolysis whereby the desired diolefinic hydrocarbon is separated from the silver nitrate. When the solid complex is treated by means of the addition of ammonia hydroxide, the resulting silver-ammonia complex is then subjected to further treatment with nitric acid to produce silver nitrate which is then recycled to the reactor as a portion of the feed stock. When the solid diolefinic hydrocarbon-silver nitrate complex is treated in a thermal manner the residual silver nitrate is heated to its melting point and passed to a quench zone where water is added to reform the aqueous silver nitrate solution and thereafter the solution is also recycled to the reaction zone as a part of the feed stock.

The following examples are given to illustrate the process of the present invention which, however, are not intended to limit the generally broad scope of the present invention in strict accordance therewith.

Example I

In this example the product resulting from an organo-nickel-catalyzed cyclocooligomerization of butadiene and ethylene, utilizing a toluene solvent, contains as the major components thereof, 23 wt. percent toluene, 7 wt. percent 1,4,9-decatriene, 10 wt. percent 1,5,9-cyclododecatriene and 57 wt. percent t,c-1,5-cyclodecadiene. A charge comprising 1.5 g. of this mixture was placed in a reaction vessel and 10 g. of a 20 wt. percent silver nitrate solution was added thereto. The mixture was mechanically shaken for a period of 4 hours at 23° C. At the end of this time, the white solid comprising a cyclodecadiene-silver nitrate complex was filtered off, washed with water, then washed with n-pentane and air-dried to yield a grayish-white crystalline complex. The solid was decomposed with an excess of cold, concentrated ammonium hydroxide. The resulting hydrocarbon phase was extracted with pentane, the extract was dried on anhydrous sodium sulfate and then stripped of the solvent. The residual oil was analyzed by means of a gas-liquid chromatograph and infrared spectroscopy being determined thereby that most of the t,c-1,5-cyclodecadiene originally present in the cyclocooligomerization product had been selectively removed by complexation with the silver nitrate solution. The remaining cyclodecadiene was isolated along with essentially all of the decatriene and cyclododecatriene as uncomplexed hydrocarbons from the filtrate resulting from the complexation step.

Example II

In this example 1.5 g. of the cyclocooligomerization product described in Example I above was treated with 20 g. of a 20 wt. percent silver nitrate solution and 3.0 cc. of cyclohexane. The mixture was mechanically shaken for a period of 22 hours at about 23° C. The white solid resulting from the complexation of t,c-1,5-cyclodecadiene with the silver nitrate was treated in a manner similar to that set forth in Example I above thereby recovering a substantial portion of the t,c-1,5-cyclodecadiene after decomposition of the complex with concentrated ammonium hydroxide.

Example III

In this example 1.5 g. of a cyclocooligomerization product resulting from the organo-nickel-catalyzed reaction of butadiene and ethylene, and which contains, as the major components thereof, about 57 wt. percent t,c-1,5-cyclodecadiene, about 10 wt. percent 1,5,9-cyclododecatriene and about 7 wt. percent 1,4,9-decatriene is treated with 10 g. of a 20 wt. percent aqueous silver nitrate solution. The mixture is mechanically agitated for a period of about 22 hours while maintaining the reactor and contents thereof at ambient temperature. At the end of this time the white solid cyclodecadiene-silver nitrate complex is filtered, washed with water, extracted with pentane and air-dried to yield a grayish-white crystalline complex. This complex is then subjected to flash pyrolysis at a temperature of about 160° C. for a period of about 5 seconds under a reduced pressure of about 1 mm. The cyclodecadiene is recovered from the flash chamber while the residual silver nitrate is drawn off by conventional means.

I claim as my invention:

1. A process for the selective removal of a cyclodecadienic hydrocarbon from a mixture of cyclodecadienic, decatrienic and cyclododecatrienic hydrocarbons which comprises treating said mixture with an aqueous silver nitrate solution containing from about 10 weight percent to about 75 weight percent silver nitrate at a temperature in the range of from about 10° to about 60° C., separating the resultant solid cyclodecadienic hydrocarbon-silver nitrate complex from said decatrienic and cyclododecatrienic hydrocarbons, and recovering said cyclodecadienic hydrocarbon.

2. The process as set forth in claim 1 further characterized in that said cyclodecadienic hydrocarbon is recovered by treating said solid complex with aqueous ammonia to yield cyclodecadienic hydrocarbon and a silver-ammonia inorganic complex.

3. The process as set forth in claim 1 further characterized in that said cyclodecadienic hydrocarbon is recovered by thermally decomposing said complex at a temperature in the range of from about 125° up to about 160° C. at a reduced pressure.

4. The process as set forth in claim 1 further characterized in that said cyclodecadienic hydrocarbon comprises t,c-1,5-cyclodecadiene and said decatrienic and cyclododecatrienic hydrocarbons comprise 1,4,9-decatriene and 1,5,9-cyclododecatriene.

References Cited

UNITED STATES PATENTS

| | | | |
|---|---|---|---|
| 3,268,613 | 8/1966 | Suzuki | 260—681.5 |
| 3,287,428 | 11/1966 | Peck | 260—681.5 X |

OTHER REFERENCES

Trebellas et al.: "Metal-Olefin Complexes I" Inorg. Chem. 4(12) 1818–9 (1965); Chem. Abstr. 64 5131e (1966).

Palvarini et al.: (Ital. 670, 243) Chem. Abstr. 64 11252b (1966).

DELBERT E. GANTZ, *Primary Examiner.*

U.S. Cl. X.R.

260—677